(12) United States Patent
Shinagawa et al.

(10) Patent No.: US 8,090,172 B2
(45) Date of Patent: Jan. 3, 2012

(54) ROBUST SEGMENTATION OF BREAST AND MUSCLE IN MRI

(75) Inventors: Yoshihisa Shinagawa, Downingtown, PA (US); Gerardo Hermosillo Valadez, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 776 days.

(21) Appl. No.: 12/207,826

(22) Filed: Sep. 10, 2008

(65) Prior Publication Data
US 2009/0067698 A1    Mar. 12, 2009

Related U.S. Application Data

(60) Provisional application No. 60/971,643, filed on Sep. 12, 2007.

(51) Int. Cl.
*G06K 9/00* (2006.01)
*G06K 9/38* (2006.01)

(52) U.S. Cl. ........................ 382/128; 382/173; 382/281

(58) Field of Classification Search .................. 382/128, 382/159, 173, 174, 281; 324/309, 307
See application file for complete search history.

(56) References Cited

U.S. PATENT DOCUMENTS
6,035,056 A    3/2000  Karssemeijer
7,440,636 B2 * 10/2008 Bober et al. .................. 382/281
7,680,312 B2 * 3/2010  Jolly et al. .................... 382/128
2008/0125643 A1  5/2008  Huisman et al.
2010/0215238 A1 * 8/2010  Lu et al. ........................ 382/131

FOREIGN PATENT DOCUMENTS
WO    2005/029412 A    3/2005

OTHER PUBLICATIONS

Lu et al., "DCE-MRI segmentation and motion correction based on active contour model and forward mapping", Seventh ACIS International Conference on Software Engineering, Artificial Intelligence, Networking, and Parallel/Distributed Computing, IEEE Comput Soc., Los Alamitos, CA, 2006.
Baringer et al., "Computer vision hardware using the Radon transform", Proceedings of the Computer Society Conference on Computer Vision and Pattern Recognition, Lahaina, Maui, Hawaii, Jun. 3-6, 1991, IEEE, pp. 508-513.
International Search Report including Notification of Transmittal of the International Search Report, International Search Report, and Written Opinion of the International Searching Authority.

* cited by examiner

*Primary Examiner* — Louis Arana
(74) *Attorney, Agent, or Firm* — Peter Withstandley

(57) ABSTRACT

A method for segmenting an anatomical structure within medical image data includes acquiring medical image data. The medical image data is transformed from an original image space into a projective dual image space. A boundary of an anatomical structure is identified within the transformed medical image data based on a set of preexisting training data. An inverse transform is performed on the transformed medical image data and the identified boundary to convert the transformed medical image data and the identified boundary into the original image space. The inverse transformed identified boundary of the anatomical structure is used to segment the anatomical structure within the acquired medical image data.

20 Claims, 5 Drawing Sheets

ROBUST SEGMENTATION OF BREAST AND MUSCLE IN MRI

CROSS-REFERENCE TO RELATED APPLICATION

The present application is based on provisional application Ser. No. 60/971,643 filed Sep. 12, 2007, the entire contents of which are herein incorporated by reference.

BACKGROUND OF THE INVENTION

1. Technical Field

The present disclosure relates to segmentation in MRI and, more specifically, to robust segmentation of breast and muscle in MRI.

2. Discussion of Related Art

Computer aided diagnosis (CAD) is the process of using computer vision systems to analyze medical image data and make a determination as to what regions of the image data are potentially problematic. Some CAD techniques then present these regions of suspicion to a medical professional such as a radiologist for manual review, while other CAD techniques make a preliminary determination as to the nature of the region of suspicion. For example, some CAD techniques may characterize each region of suspicion as a lesion or a non-lesion. The final results of the CAD system may then be used by the medical professional to aid in rendering a final diagnosis.

Because CAD techniques may identify lesions that may have been overlooked by a medical professional working without the aid of a CAD system, and because CAD systems can quickly direct the focus of a medical professional to the regions most likely to be of diagnostic interest, CAD systems may be highly effective in increasing the accuracy of a diagnosis and decreasing the time needed to render diagnosis. Accordingly, scarce medical resources may be used to benefit a greater number of patients with high efficiency and accuracy.

CAD techniques have been applied to the field of mammography, where low-dose x-rays are used to image a patient's breast to diagnose suspicious breast lesions. However, because mammography relies on x-ray imaging, mammography may expose a patient to potentially harmful ionizing radiation. As many patients are instructed to undergo mammography on a regular basis, the administered ionizing radiation may, over time, pose a risk to the patient. Moreover, it may be difficult to use x-rays to differentiate between different forms of masses that may be present in the patient's breast. For example, it may be difficult to distinguish between calcifications and malignant lesions.

Magnetic resonance imaging (MRI) is a medical imaging technique that uses a powerful magnetic field to image the internal structure and certain functionality of the human body. MRI is particularly suited for imaging soft tissue structures and is thus highly useful in the field of oncology for the detection of lesions.

In dynamic contrast enhanced MRI (DCE-MRI), many additional details pertaining to bodily soft tissue may be observed. These details may be used to further aid in diagnosis and treatment of detected lesions.

DCE-MRI may be performed by acquiring a sequence of MR images that span a time before magnetic contrast agents are introduced into the patient's body and a time after the magnetic contrast agents are introduced. For example, a first MR image may be acquired prior to the introduction of the magnetic contrast agents, and subsequent MR images may be taken at a rate of one image per minute for a desired length of time. By imaging the body in this way, a set of images may be acquired that illustrate how the magnetic contrast agent is absorbed and washed out from various portions of the patient's body. This absorption and washout information may be used to characterize various internal structures within the body and may provide additional diagnostic information.

However, when imaging the breast for the purposes of performing computer-assisted detection of potential breast lesions, for example, using DCE-MRI, tissue such as muscle may appear with a high level of enhancement that may complicate the search for potential breast lesions. Accordingly, it may be beneficial to first segment the acquired medical image data to isolate the breast tissue from the surrounding musculature.

Because of its close proximity to the breast, the pectoral muscle may segmented and removed from the acquired medical image data prior to analyzing the breast tissue for potential lesions. It may be also beneficial to detect the invasion of the muscle by a cancer by judging whether the cancer touches the muscle.

Segmentation of the pectoral muscle, however, may be particularly difficult owing to the relatively unclear boundaries that are obtained by performing MR imaging on the pectoral muscle.

SUMMARY

A method for segmenting an anatomical structure within medical image data includes acquiring medical image data. The medical image data is transformed from an original image space into a projective dual image space. A boundary of an anatomical structure is identified within the transformed medical image data based on a set of preexisting training data. An inverse transform is performed on the transformed medical image data and the identified boundary to convert the transformed medical image data and the identified boundary into the original image space. The inverse transformed identified boundary of the anatomical structure is used to segment the anatomical structure within the acquired medical image data.

The medical image data may be acquired using a magnetic resonance imager. The medical image data may be DCE-MR image data. Alternatively, the medical image data may be CT image data.

The medical image data may be transformed from the original image space into the projective dual image space using a Hough transform and the inverse transform may be an inverse Hough transform.

The medical image data may be transformed from the original image space into the projective dual image space using a three-dimensional Radon transform and the inverse transform may be an inverse Radon transform.

Identifying the boundary of the anatomical structure within the transformed medical image data may include searching for a patch within the transformed medical image data that is most similar to a patch within the training data and using a segmented boundary within the training data that corresponds to the most similar patch as a basis for the identified boundary.

The segmented boundary within the training data may be skewed to form the identified boundary in accordance with a deviation between: a location of the most similar patch within the training data and a location of a coordinate origin in the training data; and a location of the patch within the transformed medical image data and a location of a coordinate origin in the transformed medical image data.

The boundary of the anatomical structure may be identified within the transformed medical image data by matching a shape prior from the training data against the transformed medical image.

The medical image data may include an image of a breast and the anatomical structure may be a muscle such as the pectoral muscle.

The segmented anatomical structure may be removed from the medical image data and a region of suspicion may be automatically identified within the medical image data that has been removed of the segmented anatomical structure.

The medical image data may be a DCE-MR image data and automatically identifying the region of suspicion within the medical image data that has been removed of the segmented anatomical structure may include identifying the regions of suspicion based on an absorption and washout profile.

The preexisting training data may include a set of medical image data within which the anatomical structure has been manually segmented that has been transformed into the projective dual image space.

A method for segmenting an anatomical structure within medical image data includes acquiring medical image data in a projective dual image space. A boundary of an anatomical structure is automatically identified within the acquired medical image data based on a set of preexisting training data. An inverse transform is performed on the acquired medical image data and the identified boundary to convert the acquired medical image data and the identified boundary into a normal image space. The inverse transformed identified boundary of the anatomical structure is used to segment the anatomical structure within the inversely transformed medical image data of the normal image space.

The medical image data may be acquired directly into the projective dual image space using a CT scanner. The acquired medical image data and the identified boundary may be inversely transformed into the normal image space using an inverse Hough transform. The acquired medical image data and the identified boundary may be inversely transformed into the normal image space using an inverse Radon transform.

Identifying the boundary of the anatomical structure within the acquired medical image data may include searching for a patch within the acquired medical image data that is most similar to a patch within the training data and using a segmented boundary within the training data that corresponds to the most similar patch as a basis for the identified boundary.

The preexisting training data may include a set of medical image data within which the anatomical structure has been manually segmented that has been transformed into the projective dual image space.

A computer system includes a processor and a program storage device readable by the computer system, embodying a program of instructions executable by the processor to perform method steps for automatically detecting breast lesions. The method includes acquiring medical image data, transforming the medical image data from an original image space into a projective dual image space, identifying a boundary of a muscle within the transformed medical image data based on a set of preexisting training data that has been transformed into the projective dual image space, performing an inverse transform on the transformed medical image data and the identified boundary to convert the transformed medical image data and the identified boundary into the original image space, using the inverse transformed identified boundary of the muscle to segment the muscle within the acquired medical image data, removing the muscle from the medical image data, and automatically identifying a breast lesion candidate within the medical image data that has been removed of the muscle.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
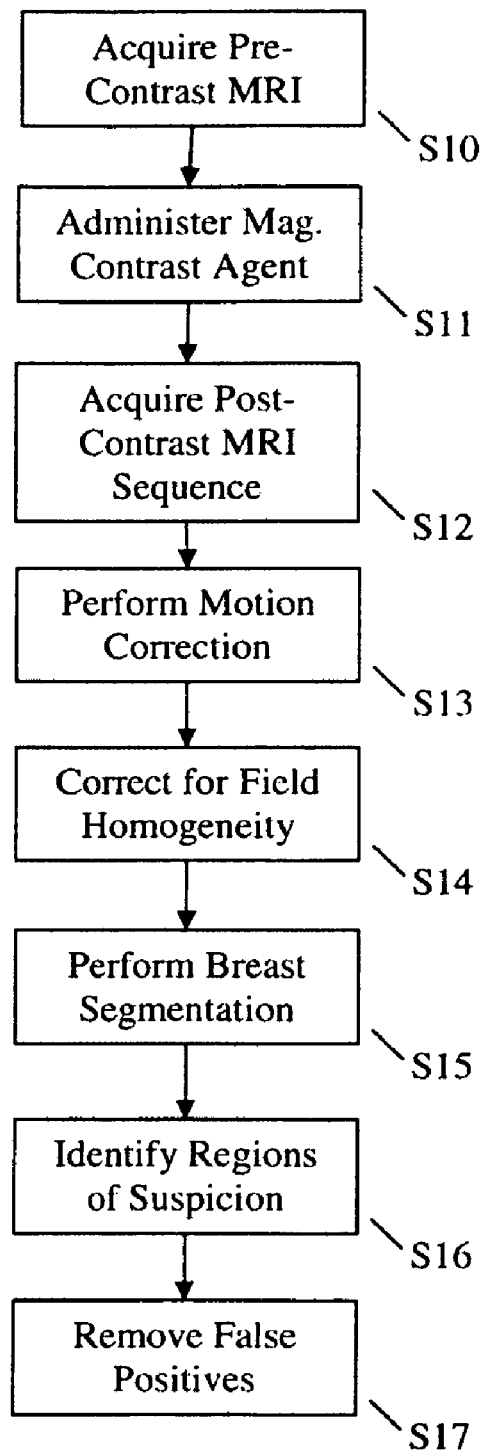
FIG. 1 is a flow chart illustrating a method for imaging a patient's breast using DCE-MRI and rendering a computer-aided diagnosis according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to image a patient's breast using DCE-MRI techniques and then perform CAD to identify regions of suspicion that are more likely to be malignant breast lesions. By utilizing DCE-MRI rather than mammography, additional data pertaining to contrast absorption and washout may be used to accurately distinguish between benign and malignant breast masses.

FIG. 1 is a flow chart illustrating a method for imaging a patient's breast using DCE-MRI and rendering a computer-aided diagnosis according to an exemplary embodiment of the present invention. First, a pre-contrast MRI is acquired (Step S10). The pre-contrast MRI may include an MR image taken of the patient before the magnetic contrast agent has been administered. The pre-contrast MRI may include one or more modalities. For example, both T1 and T2 relaxation modalities may be acquired.

Next, with the patient remaining as still as possible, the magnetic contrast agent may be administered (Step S11). The magnetic contrast agent may be a paramagnetic agent, for example, a gadolinium compound. The agent may be administered orally, intravenously, or by another means. The magnetic contrast agent may be selected for its ability to appear extremely bright when imaged in the T1 modality. By injecting the magnetic contrast agent into the patient's blood, vascular tissue may be highly visible in the MRI. Because malignant tumors tend to be highly vascularized, the use of the magnetic contrast agent may be highly effective for identifying regions suspected of being lesions.

Moreover, additional information may be gleamed by analyzing the way in which a region absorbs and washes out the magnetic contrast agent. For this reason, a sequence of post-contrast MR images may be acquired (Step S12). The sequence may be acquired at regular intervals in time, for example, a new image may be acquired every minute.

As discussed above, the patient may be instructed to remain as still as possible throughout the entire image acquisition sequence. Despite these instructions, the patient will most likely move somewhat from image to image. Accordingly, before regions of suspicion are identified (Step S16), motion correction may be performed on the images (Step S13).

At each acquisition, the image may be taken in the T1 modality that is well suited for monitoring the absorption and washout of the magnetic contrast agent.

Because MR images are acquired using a powerful magnetic field, subtle inhomogeneity in the magnetic field may have an impact on the image quality and may lead to the introduction of artifacts. Additionally, the level of enhancement in the post-contrast image sequence may be affected. Also, segmentation of the breast may be impeded by the inhomogeneity, as in segmentation, it is often assumed that a particular organ appears homogeneously. Accordingly, the effects of the inhomogeneous magnetic field may be corrected for within all of the acquired MR images (Step S14).

The order in which motion correction (Step S13) and inhomogeneity correction (Step S14) are performed on the MR images is not critical. All that is required is that these steps be performed after image acquisitions for each given image, and prior to segmentation (Step S15). These corrective steps may be performed for each image after each image is acquired or for all images after all images have been acquired.

After the corrective steps (Steps S13 and S14) have been performed, breast segmentation may be performed (Step S15). Segmentation is the process of determining the contour delineating a region of interest from the remainder of the image. In making this determination, edge information and shape information may be considered.

Edge information pertains to the image intensity changes between the interior and exterior of the contour. Shape information pertains to the probable shape of the contour given the nature of the region of interest being segmented. Some techniques for segmentation such as the classical watershed transformation rely entirely on edge information. Examples of this technique may be found in L. Vincent and P. Soille, "Watersheds in digital spaces: An efficient algorithm based immersion simulations" *IEEE Trans. PAMI,* 13(6):583-589, 1991, which is incorporated by reference. Other techniques for segmentation rely entirely on shape information. For example, in M. Kass, A. Witkin, and D. Terzopoulous, "Snakes—Active contour models" *Int J. Comp Vis,* 1(4): 321-331, 1987, which is incorporated by reference, a calculated internal energy of the curvature is regarded as a shape prior although its weight is hard-coded and not learned through training. In A. Tsai, A. Yezzi, W. Wells, C. Tempany, D. Tucker, A. Fan, and W. E. Grimson, "A shape-based approach to the segmentation of medical imagery using level sets" *IEEE Trans. Medical Imaging,* 22(2): 137-154, 2003, which is incorporated by reference, the shape prior of signed distance representations called eigenshapes is extracted by Principal Component Analysis (PCA). When the boundary of an object is unclear and/or noisy, the shape prior is used to obtain plausible delineation.

As discussed above, when searching for lesions in the breast using DCE-MRI, internal structures such as the pectoral muscles that are highly vascularized may light up with the application of the magnetic contrast agent. Thus, the pectoral muscles, and other such structures may make location of breast lesions more difficult. Accordingly, by performing accurate segmentation, vascularized structures that are not associated with the breast tissue may be removed from consideration thereby facilitating fast and accurate detection of breast lesions.

Accurate segmentation, however, may be particularly difficult to perform on the pectoral muscle because in MR images, the pectoral muscle, and other anatomical structures, may have unclear boundaries and thus edge information is not particularly sharp.

Exemplary embodiments of the present invention seek to provide methods for segmenting anatomical structures, for example, the pectoral muscle within medical image data that do not rely on sharp edge information. These techniques may use projective geometry to translate the medical image information into a projective dual image space. In the projective dual image space, the translated structure, known as the "projective dual," may show great concentrations of high-intensity points representing planes tangential to the pectoral muscle in the original image space. Accordingly, segmentation of the pectoral muscle may be more easily and more accurately performed in the projective dual image space for the projective dual, and then the segmentation information may be transformed back into the original image space. Such techniques for performing segmentation of anatomical structures, for example, the pectoral, using projective duals are described in detail below with reference to FIG. 3.

After segmentation has been performed (Step S15), the breast tissue may be isolated and regions of suspicion may be automatically identified within the breast tissue region (Step S16). A region of suspicion is a structure that has been determined to exhibit one or more properties that make it more likely to be a breast lesion than the regions of the breast tissue that are not determined to be regions of suspicion. Detection of the region of suspicion may be performed by systematically analyzing a neighborhood of voxels around each voxel of the image data to determine whether or not the voxel should be considered part of a region of suspicion. This determination may be made based on the acquired pre-contrast MR image as well as the post-contrast MR image. Such factors as size and shape may be considered.

Moreover, the absorption and washout profile of a given region may be used to determine whether the region is suspicious. This is because malignant tumors tend to show a rapid absorption followed by a rapid washout. This and other absorption and washout profiles can provide significant diagnostic information.

Breast imaging reporting and data systems (BIRADS) is a system that has been designed to classify regions of suspicion that have been manually detected using conventional breast lesion detection techniques such as mammography and breast ultrasound. Under this approach, there are six categories of suspicious regions. Category 0 indicates an incomplete assessment. If there is insufficient data to accurately characterize a region, the region may be assigned to category 0. A classification as category 0 generally implies that further imaging is necessary. Category 1 indicates normal healthy breast tissue. Category 2 indicates benign or negative. In this category, any detected masses such as cysts or fibroadenomas are determined to be benign. Category 3 indicates that a region is probably benign, but additional monitoring is recommended. Category 4 indicates a possible malignancy. In this category, there are suspicious lesions, masses or calcifications and a biopsy is recommended. Category 5 indicates that there are masses with an appearance of cancer and biopsy is necessary to complete the diagnosis. Category 6 is a malignancy that has been confirmed through biopsy.

Exemplary embodiments of the present invention may be able to characterize a given region according to the above BIRADS classifications based on the DCE-MRI data. To perform this categorization, the absorption and washout profile, as gathered from the post-contrast MRI sequence, for each given region may be compared against a predetermined understanding of absorption and washout profiles.

Figure 2:
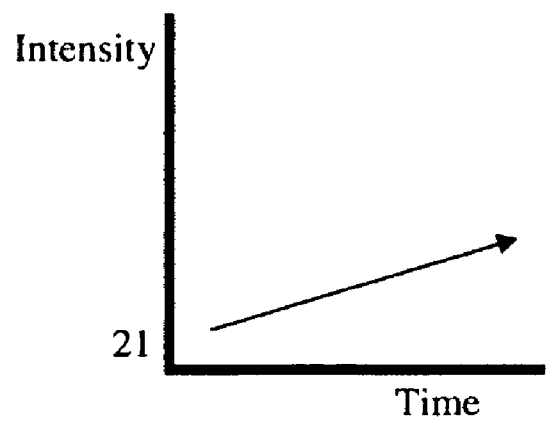
FIG. 2 is a set of graphs illustrating a correspondence between absorption and washout profiles for various BIRADS classifications according to an exemplary embodiment of the present invention.
Figure 2:
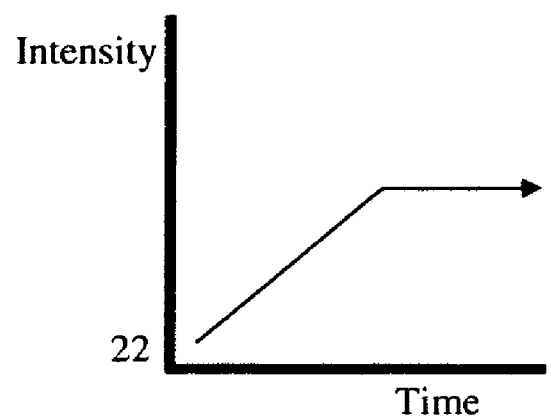
Figure 2:
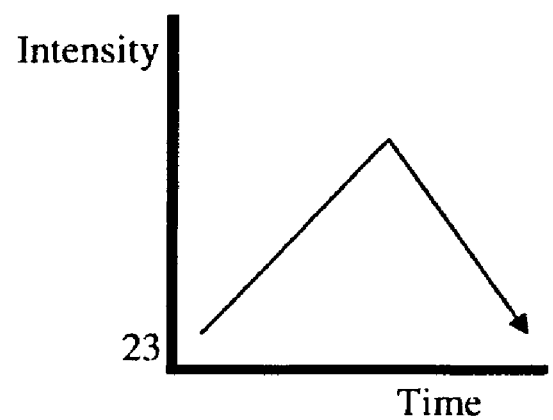

FIG. 2 is a set of graphs illustrating a correspondence between absorption and washout profiles for various BIRADS classifications according to an exemplary embodiment of the present invention. In the first graph 21, the T1 intensity is shown to increase over time with little to no decrease during the observed period. This behavior may correspond to a gradual or moderate absorption with a slow washout. This may be characteristic of normal breast tissue and accordingly, regions exhibiting this profile may be classified as category 1.

In the next graph 22, the T1 intensity is shown to increase moderately and then substantially plateau. This behavior may correspond to a moderate to rapid absorption followed by a slow washout. This may characterize normal breast tissue or a benign mass and accordingly, regions exhibiting this profile may be classified as category 2.

In the next graph 23, the T1 intensity is shown to increase rapidly and then decrease rapidly. This behavior may correspond to a rapid absorption followed by a rapid washout. While this behavior may not establish a malignancy, it may raise enough suspicion to warrant a biopsy, accordingly, regions exhibiting this profile may be classified as category 3.

Other absorption and washout profiles may be similarly established for other BIRAD categories. In this way, DCE-MRI data may be used to characterize a given region according to the BIRADS classifications. This and potentially other criteria, such as size and shape, may thus be used to identify regions of suspicion (Step S16).

After regions of suspicion have been identified, false positives may be removed (Step S17). As described above, artifacts such as motion compensation artifacts, artifacts cause by magnetic field inhomogeneity, and other artifacts, may lead to the inclusion of one or more false positives. Exemplary embodiments of the present invention and/or conventional approaches may be used to reduce the number of regions of suspicion that have been identified due to an artifact, and thus false positives may be removed. Removal of false positives may be performed by systematically reviewing each region of suspicion multiple times, each time for the purposes of removing a particular type of false positive. Each particular type of false positive may be removed using an approach specifically tailored to the characteristics of that form of false positive. Examples of such approaches are discussed in detail below.

After false positives have been removed (Step S17), the remaining regions of suspicion may be presented to the medical practitioner for further review and consideration. For example, the remaining regions of interest may be highlighted within a representation of the medical image data. Quantitative data such as size and shape measurements and or BIRADS classifications may be presented to the medical practitioner along with the highlighted image data. The presented data may then be used to determine a further course of testing or treatment. For example, the medical practitioner may use the presented data to order a biopsy or refer the patient to an oncologist for treatment.

Figure 3:
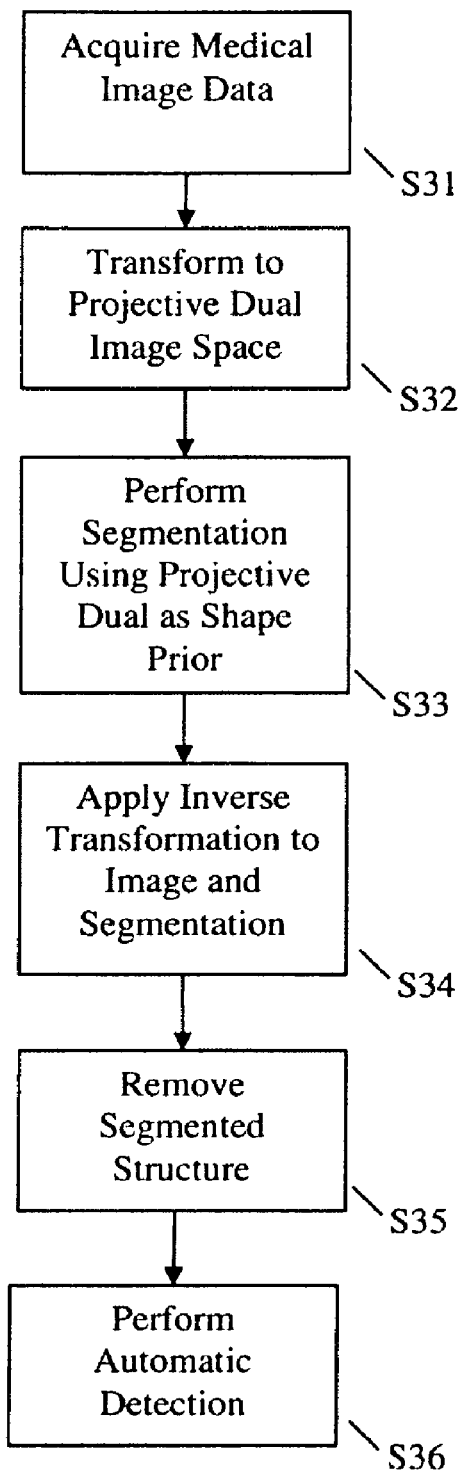
FIG. 3 is a flow chart illustrating a method for segmenting the pectoral muscle in the projective dual in a projective dual image space in accordance with an exemplary embodiment of the present invention.

As described above, segmentation of anatomical structures such as the pectoral muscle may be performed on projective duals within the projective dual image space. FIG. 3 is a flow chart illustrating a method for segmenting the pectoral muscle in the projective dual in a projective dual image space in accordance with an exemplary embodiment of the present invention. Segmentation of the pectoral muscle is shown as an example for how the methods for segmentation may be performed, however, it is to be understood that these segmentation techniques may be performed on other anatomical structures.

First, the medical image data may be acquired (Step S31). The medical image data may be acquired using an MRI or a CT scanner. The medical image data may be, for example, DCE-MR image data. The medical image data may then be transformed into projective duals within a projective dual image space (Step S32). Transformation of the medical image data may be performed using a geometric transform such as the Hough transform in the cases of discretized binary images or the Radon transform in general.

In the Hough transform, lines of image data from the original image space may be characterized in terms of their defining parameters, which in the case of a line that is defined according to the equation $y=mx+b$, is the slope parameter m and the intercept parameter b. Thus, each line may be expressed in the projective dual image space as a single point with the coordinates (b, m). However, for practical reasons, it may be preferable to express the line in terms of its polar-coordinate parameters r and $\theta$, where a line is defined according to the equation $r=x \cos \theta + y \sin \theta$. Accordingly, each line of the original image data may be transformed into a point with polar coordinates (r, $\theta$).

Similarly, a singe point in the original image space will transform into a line in the projective dual image space. Accordingly, where it might be difficult to identify lines that define edge information in an original two-dimensional image space, by transforming the image into the projective dual image space, the problem becomes one of identifying points in the projective dual, and this task may be easier to perform.

For three-dimensional image data, the Radon transform may be used to transform the image data into the Radon space, where there is duality between points and planes. Accordingly, every plane in the original image space transforms to a point in the Radon space and every point in the original image space transforms into a plane in the Radon space.

Exemplary embodiments of the present invention utilize the Hough or Radon transforms in a novel manner because segmentation has not previously been performed by shape matching while in the projective dual image space.

To determine the projective dual for a given medical image volume, a plane with a given normal n may be conceptualized as running through the image data and the intensity of every image voxel intercepting the plane may be added together to form the intensity value of the single point within the projective dual. There is accordingly a one-to-one relationship, or duality, between the planes of the original image volume and the points in the projective dual and as such, a complete dual volume may be constructed by calculating the combined intensities for every plane of the original image data. The resulting dual volume will contain all of the information of the original image, and may be easily transformed back into the original image space using an inverse transform.

In the three-dimensional spherical coordinate system, each plane may be characterized according to the equation $n = \rho (\cos \theta, \cos \phi, \cos \theta \sin \phi, \sin \phi)$ and thus each plane n may be represented by a point ($\rho$, $\theta$, $\phi$).

Thus after the medical image data has been transformed into an alternate image space such as the Hough space or the Radon space, the projective dual may be used as a shape prior and the shape of the anatomical structure to segment may be identified by matching the shape prior to a set of predetermined shape priors that are also projective duals of known instances of the anatomical structure (Step S33). Particularly, the sum of voxel intensities on a plane that is tangential to the anatomical structure may include shape information pertaining to the anatomical structure and accordingly, as the sum of voxel intensities on a plane becomes large along a tangent plane of the anatomical structure, the shape of the anatomical structure is summarized in the dual volume.

Segmentation may be performed using the projective dual as a shape prior by filtering the projective duals of the image data using known projective duals. The known projective duals may be learned through a learning process using training data, for example, as described in detail below.

Accordingly, the difficult problem of identifying the unclear boundaries of the pectoral muscle becomes a matter of performing the potentially less difficult task of identifying points within the projective dual of the projective dual image space.

Particularly, the shape of the anatomical structure may be identified in the projective dual image space by analyzing the arrangement and intensities of points that correspond with planes that are tangential to the anatomical structure in the original image space.

In identifying the shape of the anatomical structure from the medical image data that has been transformed into the projective dual image space, the transformed medical image data may be searched for a patch of a particular size, for example, 10×10×1 voxels in volume, in the $(\rho, \theta, \phi)$ space, that is most similar to a patch from the training data. The voxel pattern in the patch may be skewed due to a difference of the locations of the coordinate origin in the training data and the coordinate origin in the acquired medical image data. Accordingly, after the best match has been made, the corresponding segmentation of the match may be adapted to account for the skew.

This analysis and comparison between the projective dual image and the known projective duals may be facilitated by the use of shape indices. A shape index is a histogram that represents a planar curve. The histogram sorts each point on the curve into a set of bins according to their intensities. Thus, the shape index represents the point distribution of each curve by intensities. The projective dual of the image data may thus be filtered by the known projective duals by way of comparisons to the shape index.

After the anatomical structure has been segmented in the projective dual image space, the segmentation results may be converted back into the original image space by the application of an inverse transform (Step S34). Because of the duality between the original image space and the image space of the projective dual, the points that define the segmentation in the projective dual image space may be converted into a set of planes that are tangential to the anatomical structure and thus serve to define the bounds of the anatomical structure in three-dimensions.

Then, the segmented pectoral muscle may be removed from the medical image data (Step S35) so that the highly enhanced pectoral muscle does not interfere with the automatic detection of regions of suspicion (Step S36). Automatic detection of the regions of suspicion may be performed as discussed in detail above with respect to FIG. 1, Step S16.

Figure 4:
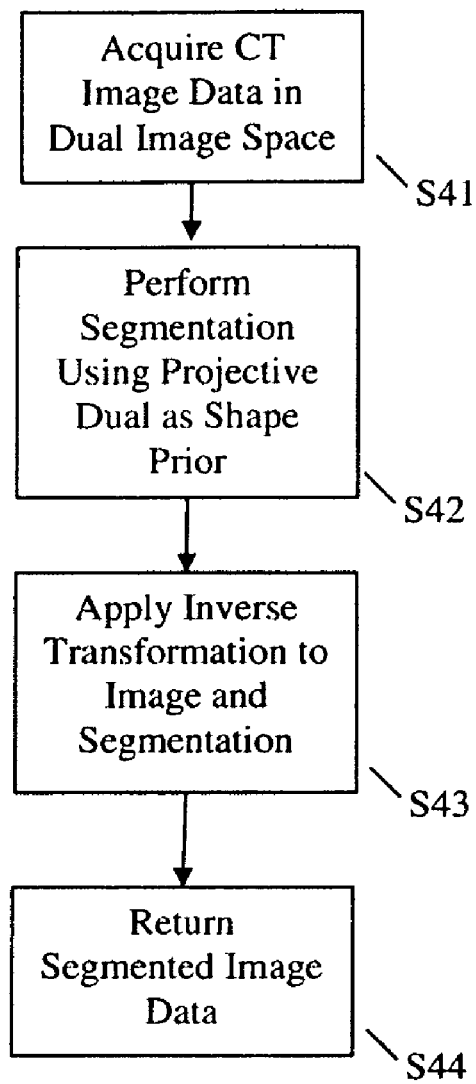
FIG. 4 is a flow chart illustrating a method for segmenting an anatomical structure from a medical image acquired using a CT scanner according to an exemplary embodiment of the present invention.

In some modalities, such as CT imaging modalities, data may be acquired directly into the projective dual image space such as the Radon space. Then, in the course of rendering the volume data for display, the acquired image data is converted into the normal image space using an inverse transform. Accordingly, in such imaging modalities, the option exists to perform segmentation prior to performing the inverse transform. FIG. 4 is a flow chart illustrating a method for segmenting an anatomical structure from a medical image acquired using a CT scanner according to an exemplary embodiment of the present invention. It is not necessary that this technique be used in order to segment a medical image acquired using a CT scanner, and indeed, the method described in detail above with respect to FIG. 3 may be used. However, because the CT scanner acquires data directly into the Radon space, segmentation may be performed prior to applying the inverse transformation to convert the acquired image data into the normal image space.

First, the medical image data may be acquired directly into a projective dual image space, for example, the Hough space (Step S41). Because CT scanners may acquire image data in this manner, the acquired medical image data may be CT image data. Next, segmentation may be performed on the acquired medical image data while still in the projective dual image space (Step S42). Segmentation may be performed in the manner discussed above with respect to FIG. 3, Step S33. Particularly, the arrangement and intensities of the points of the image data in the dual image space may be used as shape priors and automatically used to produce segmentation data using a training algorithm that has been trained for the segmentation of the type of anatomical structure in question by a set of training data for which segmentation has been manually performed.

After the anatomical structure has been segmented, the medical image data along with the segmentation information may be converted into the normal image space using an appropriate inverse transformation (Step S43). The segmented image data may then be returned for additional processing (Step S44). The additional processing may include automatic lesion detection or any other processing step that may make use of the segmented image.

As described above, segmentation may be performed in the image space of the projective dual by using the projective dual as a shape prior and using a trained learning algorithm to identify the segmentation in the projective dual image space. Thus, prior to performing these methods, the training algorithm may first be trained. Training may be performed, for example, by utilizing a set of training data that includes the anatomical structure being segmented along with a proper segmentation, both of which are in the projective dual image space. The training data may be created by having a medical practitioner such as a radiologist manually segment the anatomical structure in question. Where, for example, the anatomical structure is a pectoral muscle, the medical practitioner may segment the pectoral muscle by identifying its boundary.

Manual segmentation of the training data may be performed in the normal image space. After segmentation is performed, the training data may be transformed into the projective dual image space. It is the projective duals of the training data that may then be provided to the training algorithm so that the appropriate shape priors for segmenting the anatomical structure in the projective dual image space can be learned.

Figure 5:
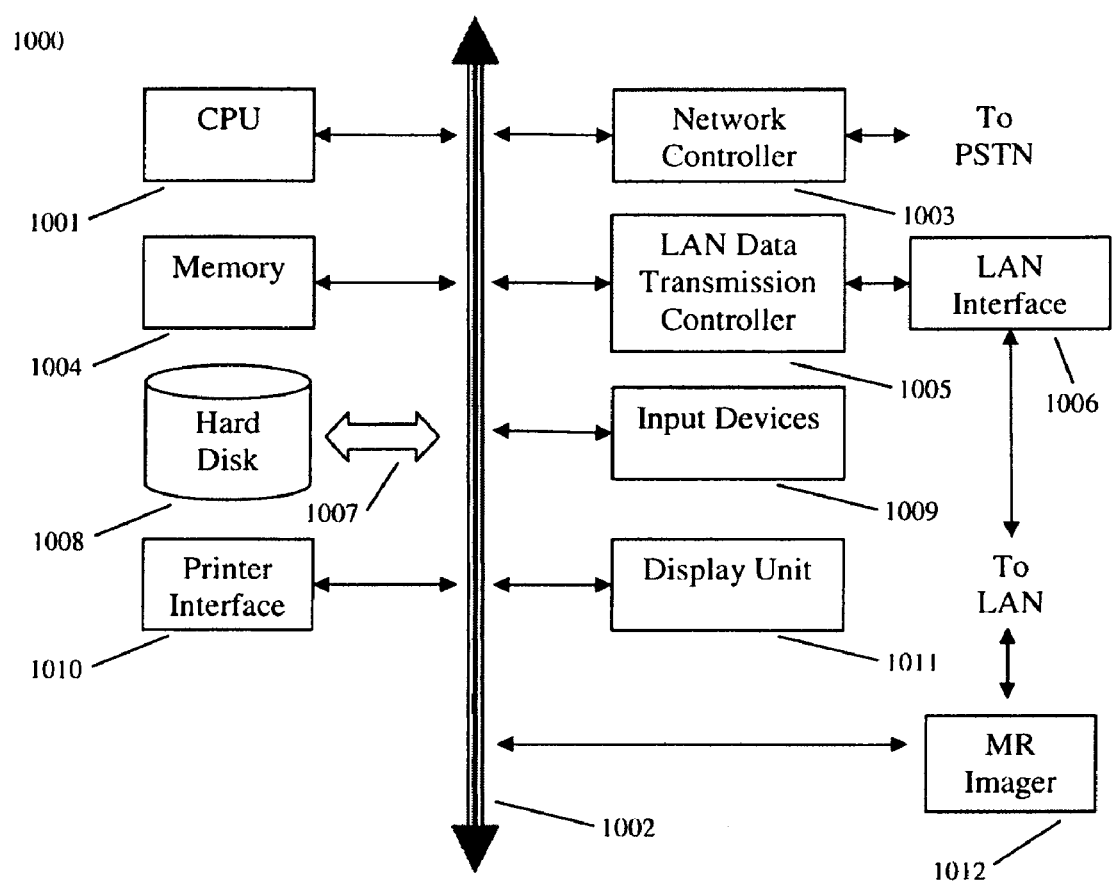
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. A MR imager 1012 may be connected to the internal bus 1002 via an external bus (not shown) or over a local area network.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for segmenting an anatomical structure within medical image data, comprising:
    acquiring medical image data;
    transforming the medical image data from an original image space into a projective dual image space;
    identifying a boundary of an anatomical structure within the transformed medical image data based on a set of preexisting training data;
    performing an inverse transform on the transformed medical image data and the identified boundary to convert the transformed medical image data and the identified boundary into the original image space; and
    using the inverse transformed identified boundary of the anatomical structure to segment the anatomical structure within the acquired medical image data.

2. The method of claim 1, wherein the medical image data is acquired using a magnetic resonance imager.

3. The method of claim 2, wherein the medical image data is DCE-MR image data.

4. The method of claim 1, wherein the medical image data is CT image data.

5. The method of claim 1, wherein the medical image data is transformed from the original image space into the projective dual image space using a Hough transform and the inverse transform is an inverse Hough transform.

6. The method of claim 1, wherein the medical image data is transformed from the original image space into the projective dual image space using a three-dimensional Radon transform and the inverse transform is an inverse Radon transform.

7. The method of claim 1, wherein identifying the boundary of the anatomical structure within the transformed medical image data includes searching for a patch within the transformed medical image data that is most similar to a patch within the training data and using a segmented boundary within the training data that corresponds to the most similar patch as a basis for the identified boundary.

8. The method of claim 7, wherein the segmented boundary within the training data is skewed to form the identified boundary in accordance with a deviation between:
    a location of the most similar patch within the training data and a location of a coordinate origin in the training data; and
    a location of the patch within the transformed medical image data and a location of a coordinate origin in the transformed medical image data.

9. The method of claim 1, wherein the boundary of the anatomical structure is identified within the transformed medical image data by matching a shape prior from the training data against the transformed medical image.

10. The method of claim 1, wherein the medical image data includes an image of a breast and the anatomical structure is a pectoral muscle.

11. The method of claim 1, additionally comprising:
    removing the segmented anatomical structure from the medical image data; and
    automatically identifying a region of suspicion within the medical image data that has been removed of the segmented anatomical structure.

12. The method of claim 11, wherein the medical image data is DCE-MR image data and automatically identifying the region of suspicion within the medical image data that has been removed of the segmented anatomical structure includes identifying the regions of suspicion based on an absorption and washout profile.

13. The method of claim 1, wherein the preexisting training data comprises a set of medical image data within which the anatomical structure has been manually segmented that has been transformed into the projective dual image space.

14. A method for segmenting an anatomical structure within medical image data, comprising:
    acquiring medical image data in a projective dual image space;
    identifying a boundary of an anatomical structure within the acquired medical image data based on a set of preexisting training data;
    performing an inverse transform on the acquired medical image data and the identified boundary to convert the acquired medical image data and the identified boundary into a normal image space; and
    using the inverse transformed identified boundary of the anatomical structure to segment the anatomical structure within the inversely transformed medical image data of the normal image space.

15. The method of claim 14, wherein the medical image data is acquired directly into the projective dual image space using a CT scanner.

16. The method of claim 14, wherein the acquired medical image data and the identified boundary are inversely transformed into the normal image space using an inverse Hough transform.

17. The method of claim 14, wherein the acquired medical image data and the identified boundary are inversely transformed into the normal image space using an inverse Radon transform.

18. The method of claim 14, wherein identifying the boundary of the anatomical structure within the acquired medical image data includes searching for a patch within the acquired medical image data that is most similar to a patch within the training data and using a segmented boundary within the training data that corresponds to the most similar patch as a basis for the identified boundary.

19. The method of claim 14, wherein the preexisting training data comprises a set of medical image data within which the anatomical structure has been manually segmented that has been transformed into the projective dual image space.

20. A computer system comprising:
    a processor; and
    a program storage device readable by the computer system, embodying a program of instructions executable by the processor to perform method steps for automatically detecting breast lesions, the method comprising:

acquiring medical image data;

transforming the medical image data from an original image space into a projective dual image space;

identifying a boundary of a muscle within the transformed medical image data based on a set of preexisting training data that has been transformed into the projective dual image space;

performing an inverse transform on the transformed medical image data and the identified boundary to convert the transformed medical image data and the identified boundary into the original image space;

using the inverse transformed identified boundary of the muscle to segment the muscle within the acquired medical image data;

removing the muscle from the medical image data; and automatically identifying a breast lesion candidate within the medical image data that has been removed of the muscle.

* * * * *